United States Patent
Hofman et al.

(10) Patent No.: US 9,491,038 B2
(45) Date of Patent: Nov. 8, 2016

(54) CONTENT VIRALITY DETERMINATION AND VISUALIZATION

(71) Applicant: Microsoft Corporation, Redmond, WA (US)

(72) Inventors: Jake Hofman, New York, NY (US); Robert Gruen, Seattle, WA (US); Sharad Goel, New York, NY (US); Duncan Watts, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 13/772,326

(22) Filed: Feb. 21, 2013

(65) Prior Publication Data
US 2014/0237093 A1    Aug. 21, 2014

(51) Int. Cl.
| | |
|---|---|
| *G06F 15/16* | (2006.01) |
| *H04L 12/24* | (2006.01) |
| *G06F 17/30* | (2006.01) |
| *G06Q 10/10* | (2012.01) |
| *G06Q 50/00* | (2012.01) |

(52) U.S. Cl.
CPC ......... *H04L 41/00* (2013.01); *G06F 17/30861* (2013.01); *G06Q 10/10* (2013.01); *G06Q 50/01* (2013.01)

(58) Field of Classification Search
CPC .. G06Q 30/02; G06Q 50/01; G06Q 30/0254; G06F 17/30867; G06F 17/30616; G06F 2221/2133; G06N 99/005; H04L 51/32
See application file for complete search history.

(56) References Cited

U.S. PATENT DOCUMENTS

| | | | |
|---|---|---|---|
| 7,974,868 B2* | 7/2011 | Tseng et al. | 705/7.31 |
| 7,992,171 B2 | 8/2011 | Amidon et al. | |
| 8,010,657 B2 | 8/2011 | Hall et al. | |
| 8,332,512 B1* | 12/2012 | Wu et al. | 709/224 |
| 8,615,442 B1* | 12/2013 | Kapur | G06Q 30/0269 705/26.1 |
| 2008/0198794 A1* | 8/2008 | Fields et al. | 370/328 |
| 2008/0256233 A1* | 10/2008 | Hall | G06Q 30/02 709/224 |
| 2011/0071891 A1* | 3/2011 | Gavita et al. | 705/14.16 |
| 2011/0225514 A1 | 9/2011 | Goldman et al. | |
| 2011/0288912 A1* | 11/2011 | McCrea | G06Q 30/02 705/14.2 |
| 2011/0313996 A1* | 12/2011 | Strauss et al. | 707/709 |
| 2012/0215903 A1* | 8/2012 | Fleischman | G06Q 30/0201 709/224 |
| 2012/0324008 A1* | 12/2012 | Werz et al. | 709/204 |
| 2014/0149888 A1* | 5/2014 | Morris | G06F 15/16 715/753 |

OTHER PUBLICATIONS

"International Search Report & Written Opinion for PCT Patent Application No. PCT/US2014/016656", Mailed Date: Jun. 13, 2014, Filed Date: Feb. 17, 2014, 7 Pages.
"Notice from the European Patent Office, Dated Oct. 1, 2007—Concerning Business Methods", In Official Journal European Patent Office, vol. 30, Issue 11, Nov. 2007, pp. 592-593.

* cited by examiner

*Primary Examiner* — Brian J Gillis
*Assistant Examiner* — Kamran Mohammadi
(74) *Attorney, Agent, or Firm* — Florin Corie; Tom Wong; Micky Minhas

(57) ABSTRACT

Various techniques of content virality determination and visualization are disclosed herein. For example, a method of determining network content virality metric includes constructing a diffusion cascade for a computer network content based on a plurality of time points at which individual users adopt the network content and connection information of the users. The method also includes calculating, with a processor, a virality metric of the network content based on a structural characteristic of the constructed diffusion cascade. Based on the calculated virality metric, one may determine if the network content is viral.

20 Claims, 8 Drawing Sheets

CONTENT VIRALITY DETERMINATION AND VISUALIZATION

BACKGROUND

The phrase "going viral" has been used to describe fast propagation of internet content. For example, a user can post a video, an article, a comment, and/or other suitable content online or publish the video in other suitable manners. For a variety of reasons, other users may view and/or share the posted content with additional users. If the content propagates fast enough to reach a large number of users in a short amount of time, the content may be deemed "going viral." Such "viral" content, however, may be difficult to distinguish from other non-viral content due to certain shared traits. For example, a broadcast from a single user to a large number of users can also have fast propagation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present technology is directed to techniques for determining and/or visualizing virality of a network content in a social or information network. Embodiments of the present technology can determine a propagation pattern of a network content across a social or information network based on a plurality of time points at which individual users adopt the network content and connection information of these users. The propagation pattern can include a diffusion cascade and/or other suitable structures that represent temporal propagation of the network content from one user to another across the network.

Embodiments of the present technology can also calculate a virality metric of the network content based on a structural characteristic of the propagation pattern. For example, the virality metric can include an average distance between pairs of users who have experienced the network content. In another example, the virality metric can include a relative size of the largest broadcast as a fraction of the total propagation size. In a further example, the virality metric can also include an average depth of users in the propagation pattern, probability of distinct upstream sources, and/or other suitable structural characteristics. In a further aspect, the technology can include visualizing the determined virality by, for example, plotting the propagation pattern in a static or time-lapsed manner.

DETAILED DESCRIPTION

Various embodiments of systems, devices, components, modules, routines, and processes for content virality determination and/or visualization are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-5D.

As used herein, the term "network content" generally refers to a communication object that may be propagated across a computer network or other suitable types of network. Examples of network content can include product/service offerings, product/service information, news stories, articles, user status updates, videos, images, or electronic books. A network content may propagate across the Internet, a local area network, a metropolitan area network, a wide area network, a virtual private network, and/or other suitable types of network. Also used herein, the term "adoption" or "adopt" generally refers to retrieving, experiencing, recommending, retransmitting, posting, and/or otherwise interacting with a network content. For example, a user can "adopt" an online video by clicking a link to the video, watching the video, downloading the video, liking the video, reposting the video, linking the video on another webpage, commenting on the video, and/or sharing the video with other users in a computer social network.

As discussed above, "viral" contents may be difficult to distinguish from broadcast or other non-viral content due to certain shared traits. Embodiments of the present technology can determine virality metrics of a network content based on one or more structural characteristics of a propagation pattern of the network content across a computer network. For example, the propagation pattern can include a diffusion cascade with a plurality of nodes individually representing a user. Useful virality metrics can include an average distance between all pairs of nodes and/or other suitable structural characteristics of the propagation pattern. Based on the determined virality metrics, "viral" content may be distinguished from broadcast or other non-viral content.

Figure 1:
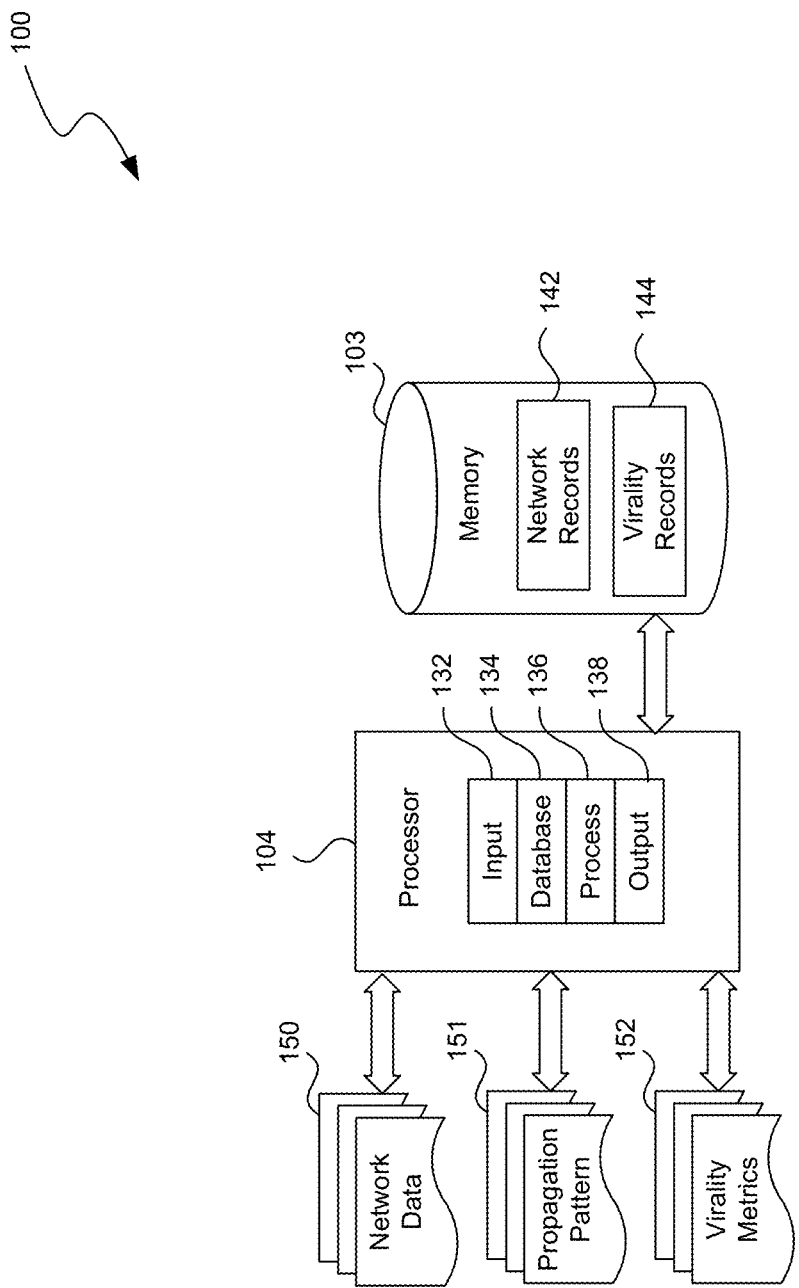
FIG. 1 is a block diagram showing computing components of a computer system suitable for content virality determination and/or visualization in accordance with embodiments of the present technology.

FIG. 1 is a block diagram showing computing components of a computer system 100 suitable for content virality determination and/or visualization in accordance with embodiments of the present technology. The computer system 100 can include a server, a desktop computer, a laptop computer, a tablet computer, a smartphone, and/or other suitable types of computing device. In certain embodiments, the computer system 100 may be a single computing device. In other embodiments, the computer system 100 may include one or more separate computing devices (not shown) individually having one or more of the computing components. In further embodiments, the computer system 100 may also be implemented as one or more virtual services executed on one or more computing device(s).

As shown in FIG. 1, the computer system 100 can include a processor 104 operatively coupled to a memory 103. The processor 104 can include a mainframe processor, a microprocessor, a field-programmable gate array, and/or other suitable logic devices. The memory 103 can include magnetic disk storage media, optical storage media, flash memory drives, random access memory, and/or other suitable computer readable storage media excluding propagated signals. The memory 103 can be configured to store data received from, as well as instructions for, the processor 104. Even though only the foregoing components of the computer system 100 are shown in FIG. 1, in other embodiments, the computer system 100 may also include network interface components, input/output components, and/or other suitable hardware/software constituents.

In the illustrated embodiment in FIG. 1, the processor 104 includes an input component 132, a database component 134, a process component 136, and an output component 138 interconnected to one another. The input component 132 can be configured to accept network data 150 from an online social network (e.g., Twitter), an enterprise network, and/or other suitable sources. The network data 150 can include content identification associated with a network content, a plurality of time points at which individual users adopt the network content, connection information of the users in the network, and/or other suitable network information associated with the network content.

The content identification can include various attributes of the network content. For example, the content identification can include at least one of a title, a description, a summary, a web address, an author, a date/time of publication, a publisher, a geographic location of the publisher, and/or other attributes of the network content. For instance, the news story, "NASA scope reveals 'magnetic braids' in sun's atmosphere, Fox News," (shown in FIG. 5D) is identified by a title, a publisher, and a date/time.

The plurality of time points can include a time stamp at which individual users adopt the network content. One or more time stamps may be associated with the user and/or the network content. For example, if a user reads a news article multiple times, multiple time stamps may be associated with the user. If the user reads the new article once, only one time stamp may be associated with the user. In further examples, if the user reads and recommends the news story, then multiple time stamps may be associated with the user for the different modes of adoption.

The connection information can include indications whether two users are "connected" in the computer network. In certain embodiments, two users may be deemed to be "connected" if:
  at least one user is in a contact list of the other user of an instant messenger service;
  at least one user is a "follower" of the other user of an online blogging service or micro-blogging service;
  at least one user is a "friend" of the other user of online social networking service; and
  at least one user is a "subscriber" of the other user of an online self-publishing service.
In other embodiments, two users may be deemed to be "connected" based on other suitable criteria so long as one user may be inferred to adopt the network content from the other user. Upon receiving the network data 150, the input component 132 communicates the network data 150 to other components for further processing.

The database component 134 is configured to organize records, including network records 142 and virality records 144, and facilitates storing and retrieving of these records to and from the memory 103. Any type of database organization may be utilized, including a flat file system, hierarchical database, relational database, or distributed database. In certain embodiments, the network records 142 can include historical and/or current network data 150 received by the input component 132. The virality records 144 can include historical and/or current virality metrics associated with the network records 142. In other embodiments, the network records 142 and/or the virality records 144 may include other suitable information.

The process component 136 is configured to analyze the network data 150 and determine one or more virality metrics for the network content. In certain embodiments, the process component 136 is configured to determine the virality metrics by constructing a diffusion cascade based on the network data 150. Examples of diffusion cascade are shown in FIGS. 5A-5D. In other embodiments, the process component 136 can determine the virality metrics using other suitable techniques. The process component 136 can then determine if the network content is a viral content or a non-viral content based on the one or more virality metrics. Embodiments of the process component 136 are described in more detail below with reference to FIG. 2.

The output component 138 can be configured to output at least one of a propagation pattern 151 or the virality metrics 152 based on the analyzed network data 150. In certain embodiments, the propagation pattern 151 may be output as a static or time-lapsed manner. In other embodiments, the propagation pattern 151 can also be output to highlight a path from one of the users to all other connected users. In further embodiments, the propagation pattern 151 may be output in other suitable manner, as described in more detail below with reference to FIGS. 5A-5D.

Figure 2:
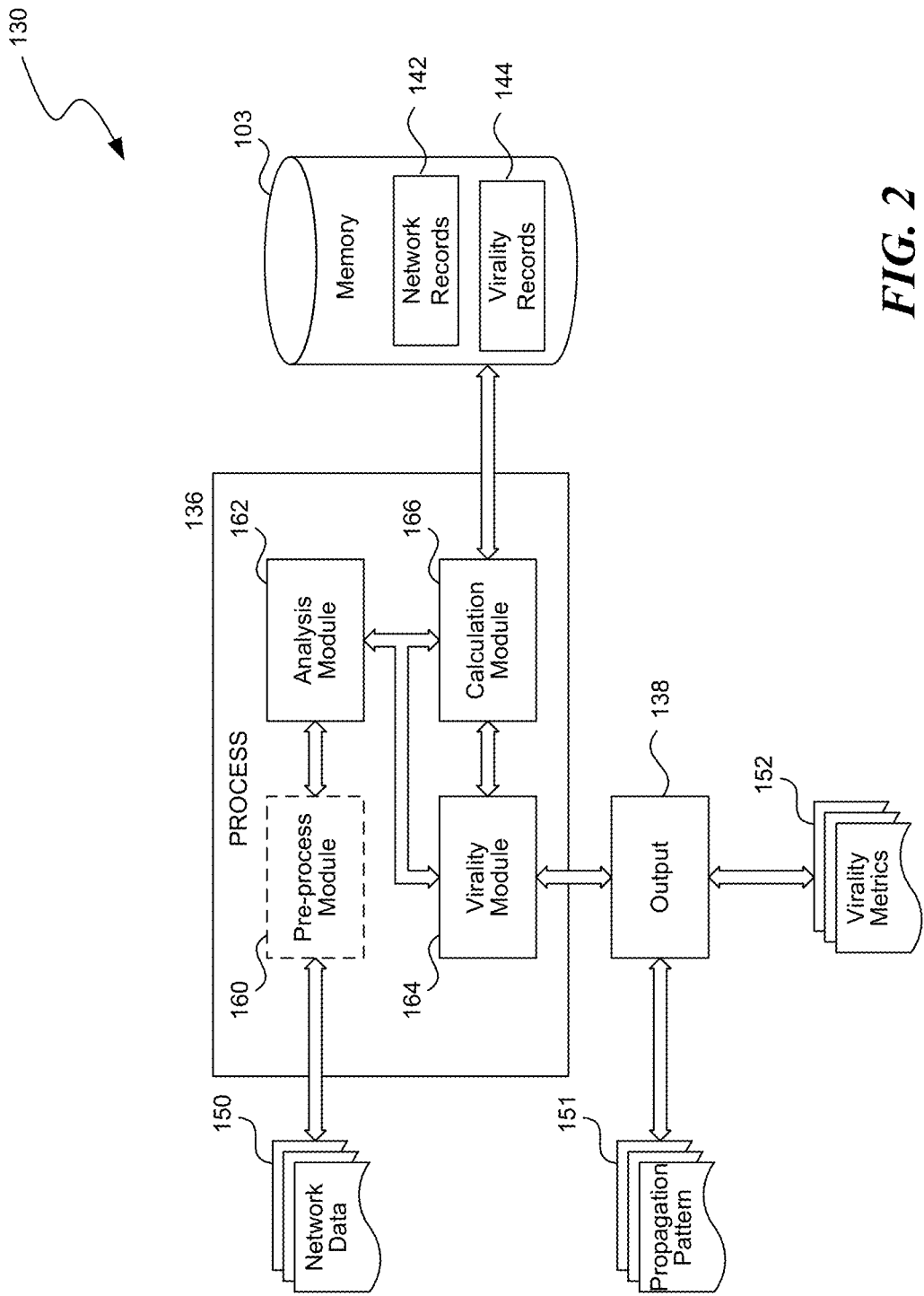
FIG. 2 is a block diagram showing software modules suitable for the process component of FIG. 1 in accordance with embodiments of the present technology.

FIG. 2 is a block diagram showing software modules 130 suitable for the process component 136 in FIG. 1 in accordance with embodiments of the present technology. As shown in FIG. 2, the process component 136 can include an optional pre-process module 160 (shown in phantom lines for clarity), an analysis module 162, a virality module 164, and a calculation module 166 interconnected with one other. Each module may be a computer program, procedure, or routine written as source code in a conventional programming language, or may be hardware modules.

The optional pre-process module 160 is configured to receive the network data 150 from the input component 132 (FIG. 1) and sort, filter, remove, interpolate, extrapolate, and/or otherwise manipulate the received network data 150 before further processing. For example, in one embodiment, the pre-process module 160 can sort the network data 150 based on at least one of
  content identification associated with a network content;
  time points at which individual users adopt the network content; or
  connection information of the users in the network.
In other embodiments, the pre-process module 160 can be configured to filter the network data 150 for a particular network content (e.g., a news story), a particular user (e.g., Bill Gates), or based on other suitable criteria. The pre-process module 160 may have comparison, character parsing, or other suitable routines. In further embodiments, the pre-process module 160 may be omitted or be configured to perform the foregoing and/or other suitable functions during or after processing the network data 150.

The analysis module 162 may be configured to analyze the network data 150 to determine one or more virality metrics of the network content. For example, in certain embodiments, the analysis module 162 can be configured to construct a diffusion cascade for the network content based on the time points at which individual users adopt the network content and the connection information of the users in the network. The diffusion cascade may have a tree like structure with a plurality of nodes representing the users. The nodes may be arranged based on the time points at which the individual users adopt the network content. A user who has adopted the network content before any of his/her connected users (i.e., having the earliest adoption time point) may be designated as a "root" node. Otherwise, the user may be designated as child node of a connected user who has most recently adopted the network content, and the connected user may be designated as a parent node of the user. Embodiments of constructing the diffusion cascade are described in more detail below with reference to FIG. 4. In other embodiments, the analysis module 162 may be configured to analyze the network data 150 in other suitable manners. The analysis module 162 can then supply the analysis results to the calculation module 166 and/or control module 164 for further processing.

The calculation module 166 can include counters, timers, and/or other suitable accumulation routines configured to perform various types of calculations to facilitate operation of other modules. For example, in one embodiment, the calculation module 166 may include a counter configured to a distance between a pair of nodes in the diffusion cascade. In another example, the calculation module 166 may include another counter to accumulate the distances of all pairs of nodes in the diffusion cascade. In yet another example, the calculation module 166 may include a divider to computer an average distance between all pairs of nodes in the diffusion cascade. In further examples, the calculation module 166 may include routines for performing time averaging, window averaging, filtering, and/or other suitable operations as described in more detail below with reference to FIGS. 3A and 3B.

The virality module 164 may be configured to determine if a network content is viral based on inputs from the analysis module 162 and/or the calculation module 166. For example, in certain embodiments, the virality module 164 can include comparison routines configured to compare at least one the following parameters for all network contents:
an average distance between all pairs of the nodes in the diffusion cascade;
a fraction of a largest number of child nodes of a single parent node over a total number of the nodes in a diffusion cascade;
a probability that two random nodes have a distinct parent node in the diffusion cascade; or
an average depth of the nodes in the diffusion cascade.

In other embodiments, the virality module 164 may include other suitable routines. If any of the comparisons indicate that the corresponding threshold has been exceeded, the virality module 164 can indicate to the output component 138 that a viral content exists in the computer network. The virality module 164 can also be configured to output at least one of the propagation pattern 151, the virality metrics 152, and/or other suitable information to the output component 138.

Figure 3A:
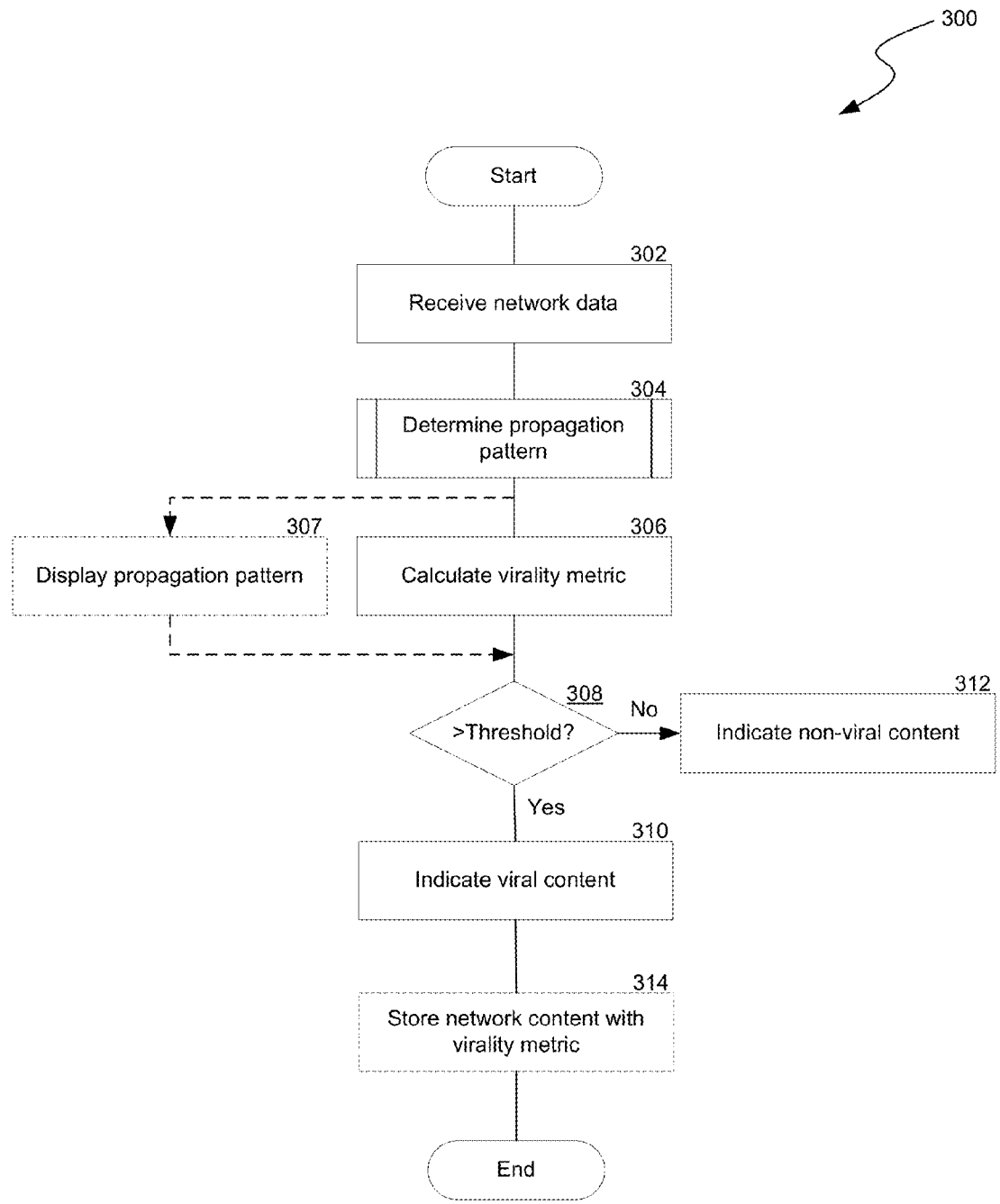
FIGS. 3A and 3B are flow diagrams illustrating a process for determining and/or visualizing content virality with the computer system 100 of FIG. 1 in accordance with embodiments of the present technology.

FIG. 3A is a flow diagram illustrating a process 300 the computer system 100 of FIG. 1 may be utilized to determine and/or visualize content virality in accordance with embodiments of the present technology. Even though the process 300 is described below with reference to the computer system 100, in other embodiments, the process 300 can also be implemented in other suitable computing devices and/or platforms.

As shown in FIG. 3A, the process 300 can include receiving the network data 150 (FIG. 1) at stage 302 by, for example, the input component 132 (FIG. 1). In one embodiment, the network data 150 may be received on a periodic basis (e.g., once an hour, once a day, once a week, and/or other suitable time intervals). In other embodiments, the network data 150 may be continuously received and updated. In further embodiments, an operator may manually provide the network data 150 to the input component 132.

The process 300 can then include determining a propagation pattern of the network content based on the network data 150 at stage 304. In certain embodiments, the propagation pattern is determined by constructing a diffusion cascade. An example process for constructing the diffusion cascade is described in more detail below with reference to FIG. 4. In other embodiments, the propagation pattern may be determined by computing an accumulative propagation (e.g., a total number of users adopt the network content), an average speed of propagation (e.g., a total number of users adopt the network content divided by a lapsed time), and/or other suitable propagation characteristics.

Based on the determined propagation pattern, the process 300 can then include calculating one or more virality metric at stage 306. In one embodiment, a virality metric can be defined as an average distance between all pairs of nodes in a diffusion cascade. For example, if one node is directly connected to another node, the connection may be determined as having one unit distance. If one node is connected to another node via an intermediate node, the connection may be determined as having two units of distance. Thus, the virality metric may be calculated as follows:

$$v = \frac{\sum_{i,j} D_{i,j}}{N(N-1)}$$

where v is the virality metric, Dij is a distance between a pair of nodes i and j, and N is the total number of nodes.

In another embodiment, a virality metric can be defined as a fraction of the largest number of child nodes of a single parent node over a total number of the nodes in the diffusion cascade. For example, if the diffusion cascade has a total number of 10 nodes with one root node and nine child nodes, then the virality metric can be determined as 9/10=0.9. In another example, if the diffusion cascade instead has a root node and nine other nodes all in sequence, then the virality metric may be determined as 1/10=0.1.

In another embodiment, a virality metric can be defined as a probability that two random nodes have a distinct parent node in the diffusion cascade. For example, if the diffusion cascade has a total number of 10 nodes with one root node and nine child nodes, then the virality metric can be determined as zero because no two nodes have a distinct parent node. In another example, if the diffusion cascade instead has a root node and nine other nodes all in sequence, then the virality metric can be determined as one because every node has a distinct parent node.

In yet another embodiment, a virality metric can be defined as an average depth of the nodes in the diffusion cascade. For example, if the diffusion cascade has a total number of 10 nodes with one root node and nine child nodes, then the virality metric can be determined as one unit distance because all depth of nodes is one unit distance. In further embodiments, a virality metric may be determined based on all of the foregoing parameters and/or other suitable parameters, for example, with individual weighting factors. In yet further embodiments, the calculated virality metric may be associated with the network content to allow searching of the network content based the calculated virality metric and/or displaying the diffusion cascade/virality metric adjacent to the network content in a search result.

Optionally, the process 300 can include displaying the propagation pattern at stage 307. In one embodiment, the propagation pattern may be displayed as a diffusion cascade in a static, real-time, or time-lapsed manner. In other embodiments, user information, network content information, and/or other suitable information may also be displayed, as described in more detail below with reference to FIGS. 5C and 5D. In further embodiments, displaying the propagation pattern may be omitted.

The process 300 can include a decision stage 308 to determine if the calculated virality metric is above a threshold. The threshold may be determined by an operator and/or an application based on suitable criteria. For example, in one embodiment, the threshold may be set to equal to an average virality of previously determined viral network contents. In other embodiments, the threshold may be set to other values. If the calculated virality metric is greater than the threshold, the process 300 include indicating the network content as viral content at stage 310; otherwise, the process 300 includes indicating the network content as non-viral content (e.g., a broadcast) at stage 312. As a result, trending network contents and/or corresponding users may be identified and/or recommended to additional users. Optionally, at stage 314, the process 300 may include storing the network content along with the associated virality metric, for example, as the virality records 144 (FIG. 1) in the memory 103 (FIG. 1).

Figure 3B:
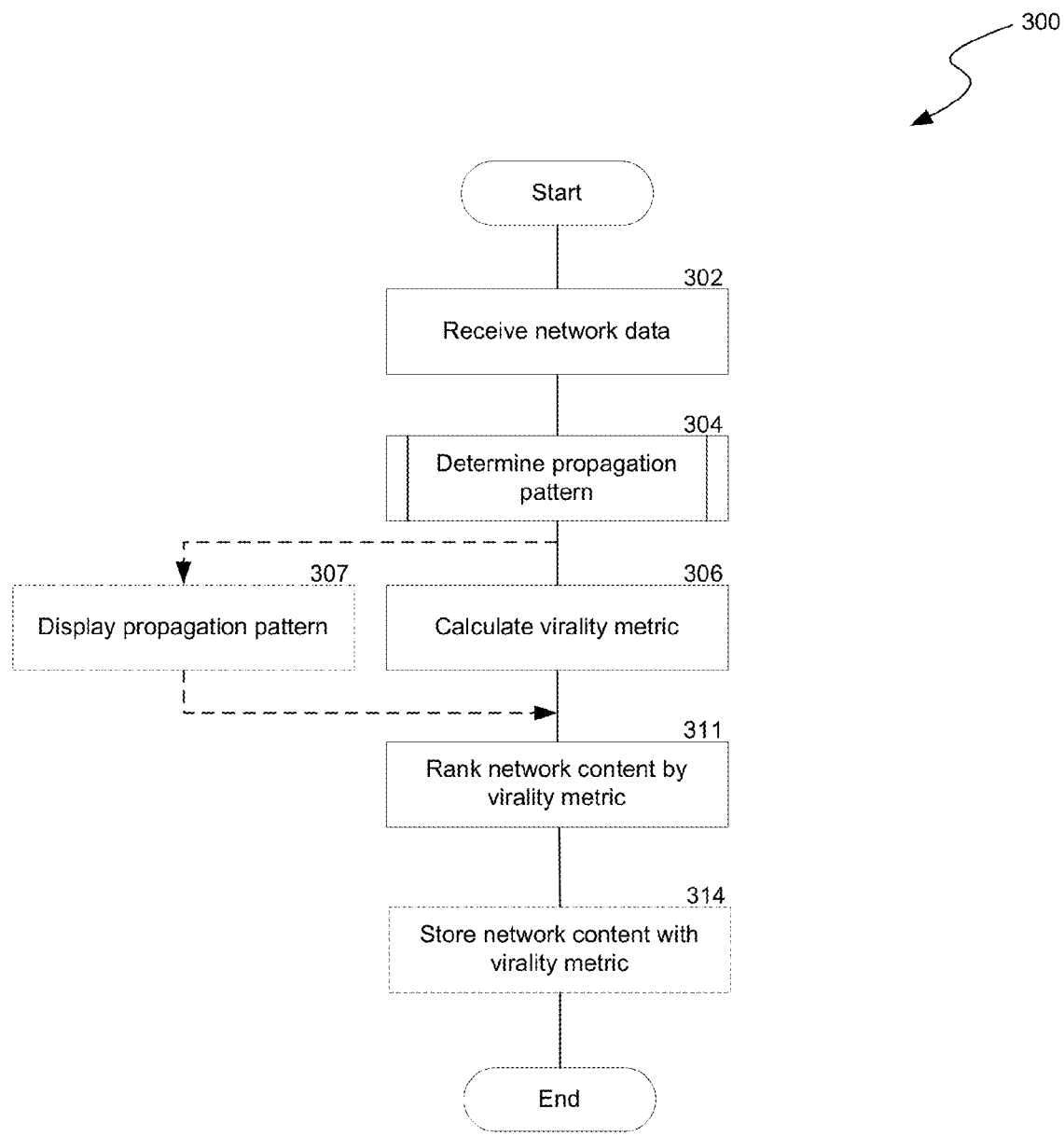

Even though the process 300 is described above as having a decision stage 308 based on a virality threshold, in other embodiments, the decision stage 308 may be omitted, and the process proceeds to storing the network content with the associated virality metric, for example, as the virality records 144 in the memory 103 at stage 314. In further embodiments, as shown in FIG. 3B, the process 300 may include ranking the network contents by associated virality metrics. As a result, the network contents may be ranked from the least viral to the most viral. In further embodiments, the network contents may also be ranked based on a combination of the virality metrics and at least one of a size, content category, and/or other characteristics of the network content.

Figure 4:
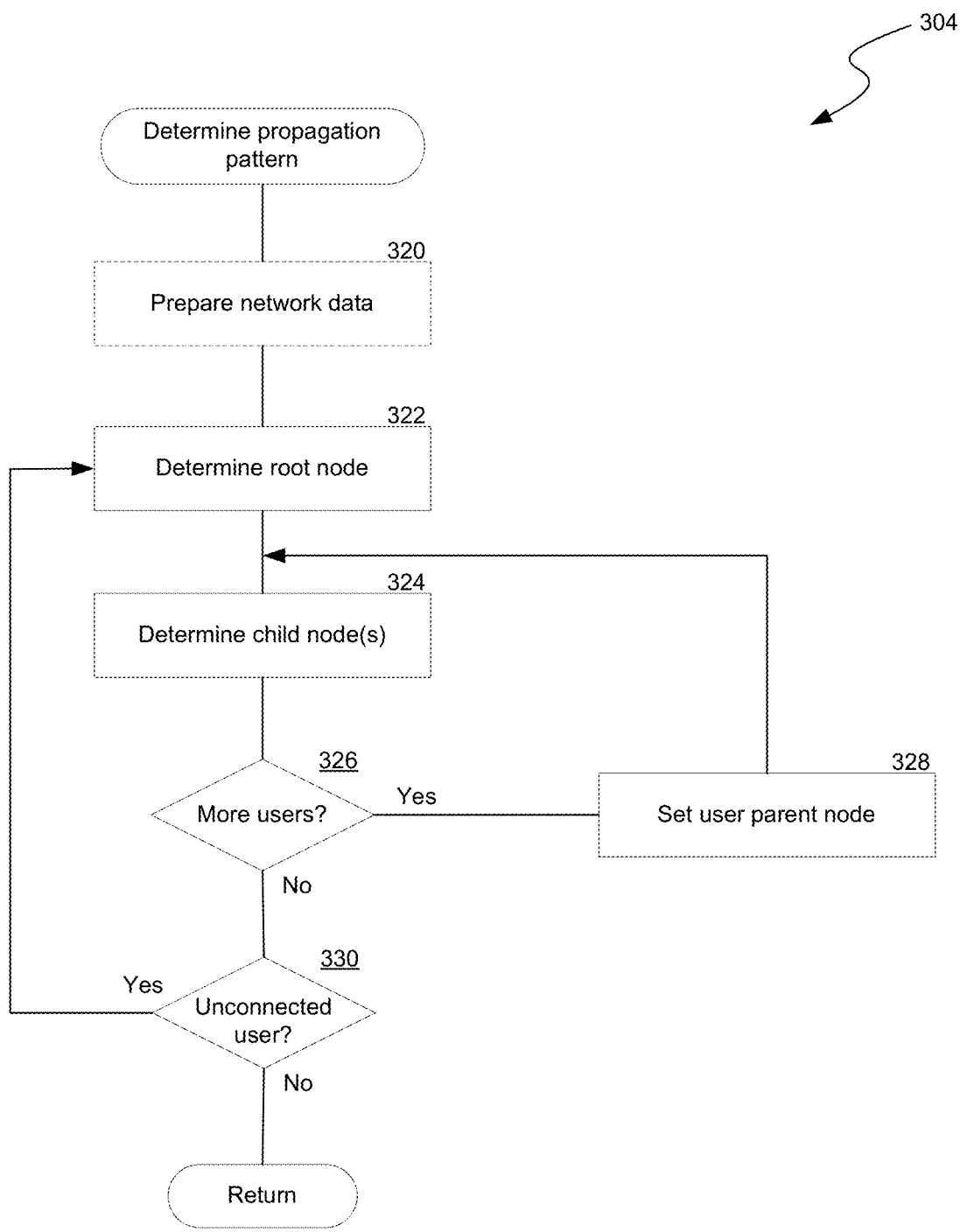
FIG. 4 is a flow diagram illustrating an example process for constructing a diffusion cascade in accordance with embodiments of the present technology.

FIG. 4 is a flow diagram illustrating an example process 304 for constructing a diffusion cascade in accordance with embodiments of the present technology. Even though the process 304 is described below with reference to the software modules 130 in FIG. 2, in other embodiments, the process 304 can also be implemented in other suitable hardware and/or software components.

As shown in FIG. 4, the process 304 can optionally include preparing network data 150 (FIG. 2) at stage 320, for example, by the optional pre-process module 160 (FIG. 2). In one embodiment, preparing the network data 150 can include sorting, filtering, and/or otherwise manipulating the network data 150. For example, duplicate time points for one user may be removed. Users may be sorted based on corresponding time points of adoption. In other embodiments, preparing the network data 150 may include other suitable operations.

The process 304 can then include searching the network data 150 for a user with the earliest time point of adoption and inferring that all other users have adopted the network content from the user with the earliest time point of adoption. The user with the earliest time point of adoption can then be designated as a root node for the diffusion cascade.

The process 304 can also include determining child node(s) based on the determined root node at stage 324, for example, by designating all users connected to the root node with adoption as child node(s) of the root node. The process 304 can then include a decision stage 326 to determine if additional users are present in the network data 150. If additional users are present, the process 304 includes setting the designated child node(s) of the root node as parent node(s) before the process reverts to determining child node(s) at stage 324; otherwise, the process proceeds to another decision stage 330 to determine if one or more unconnected users are present. If one or more unconnected users are present, the process returns to determining another root node at stage 322; otherwise, the process returns.

Even though particular operations are described above with reference to FIG. 4, in other embodiments, the process 304 may include addition and/or different operations for constructing the diffusion cascade. For example, the process 304 may include determining if a first time point of a first user is earlier than a second time point of a second user. If the first time point is earlier than the second time point, inferring that the second user has adopted the network content from the first user. Then, the first user may be designated as a parent node, and the second user may be designated as the child node. The process 304 can then include repeating at least some of the foregoing operations to derive the diffusion cascade.

Figure 5A:
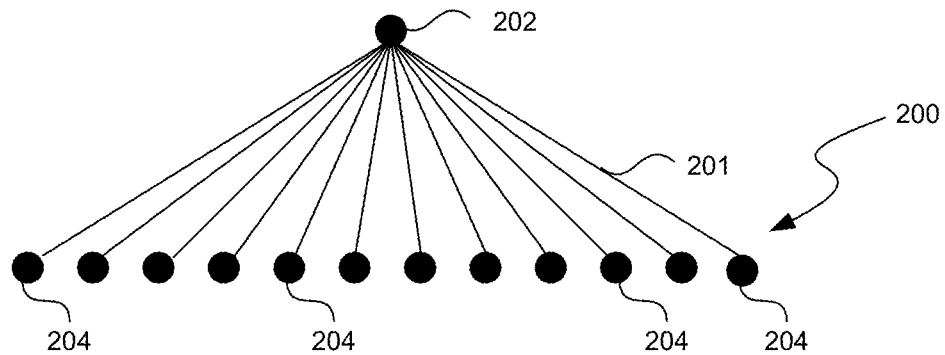
FIGS. 5A-5D are example diffusion cascades in accordance with embodiments of the present technology.
Figure 5B:
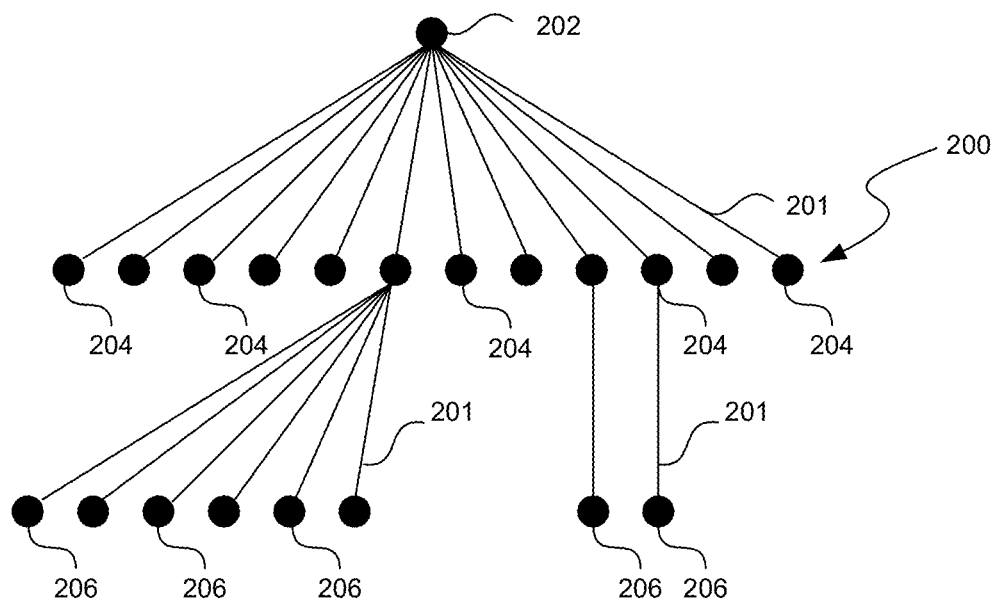

FIGS. 5A-5D are example diffusion cascades that may be constructed in accordance with embodiments of the present technology. As shown in FIGS. 5A-5D, the diffusion cascade can include a plurality of nodes 200 (shown as solid circles) each representing a user who adopts a network content. The nodes 200 can be connected to one another by an edge 201 (shown as a line) based on time points at which the corresponding users adopt the network content. For example, as shown in FIG. 5A, a first node 202 is individually connected to a plurality of second nodes 204 if the user corresponding to the first node 202 adopts the network content immediately before the users corresponding to the second nodes 204. As such, the first node 202 can be indicated as a parent node, and the second nodes 204 can be indicated as child nodes. If one of the nodes 200 does not have a parent node, the node can be indicated as a root node (e.g., the first node 202) representing a user who has the earliest time point of adoption. A node can also be a parent node and a child node at the same time. For example, as shown in FIG. 5B, the second node 204' is both a parent node to the first node 202 and a child node to a third node 206'.

Even though only one root node (i.e., the first node 202) is illustrated in FIGS. 5A-5D, in other embodiments, multiple diffusion cascades (not shown) may be constructed for the network content with more than one root nodes (not shown). For example, other users (not shown) not connected to any of the first node 202 or the second nodes 204 may independently adopt the network content. As a result, additional diffusion cascades (not shown) may be constructed with the other users as root nodes. As a result, the multiple diffusion cascades may form a "diffusion forest" or other suitable types of structure.

The diffusion cascades shown in FIGS. 5A and 5B can represent different modes of propagation. For example, FIG. 5A shows a propagation mode in which all users (e.g., the second nodes 204) have adopted a network content from one user (i.e., the first node 202). Such a propagation mode may be referred to as a broadcast. In contrast, FIG. 5B shows a propagation mode in which the network content propagates from the second nodes 204 to the third nodes 206. As such, even though the diffusion cascade of FIG. 5B includes elements of broadcast, the diffusion cascade of FIG. 5B is likely to have higher virality than that of FIG. 5A.

FIGS. 5A-5D also show examples of displaying a diffusion cascade in accordance with embodiments of the present technology. For example, FIGS. 5A-5C individually illustrate the diffusion cascade in a static manner. In another example, FIGS. 5A-5C may also be sequentially animated in a time-lapsed manner to show propagation of the network content with respect to time.

Figure 5C:
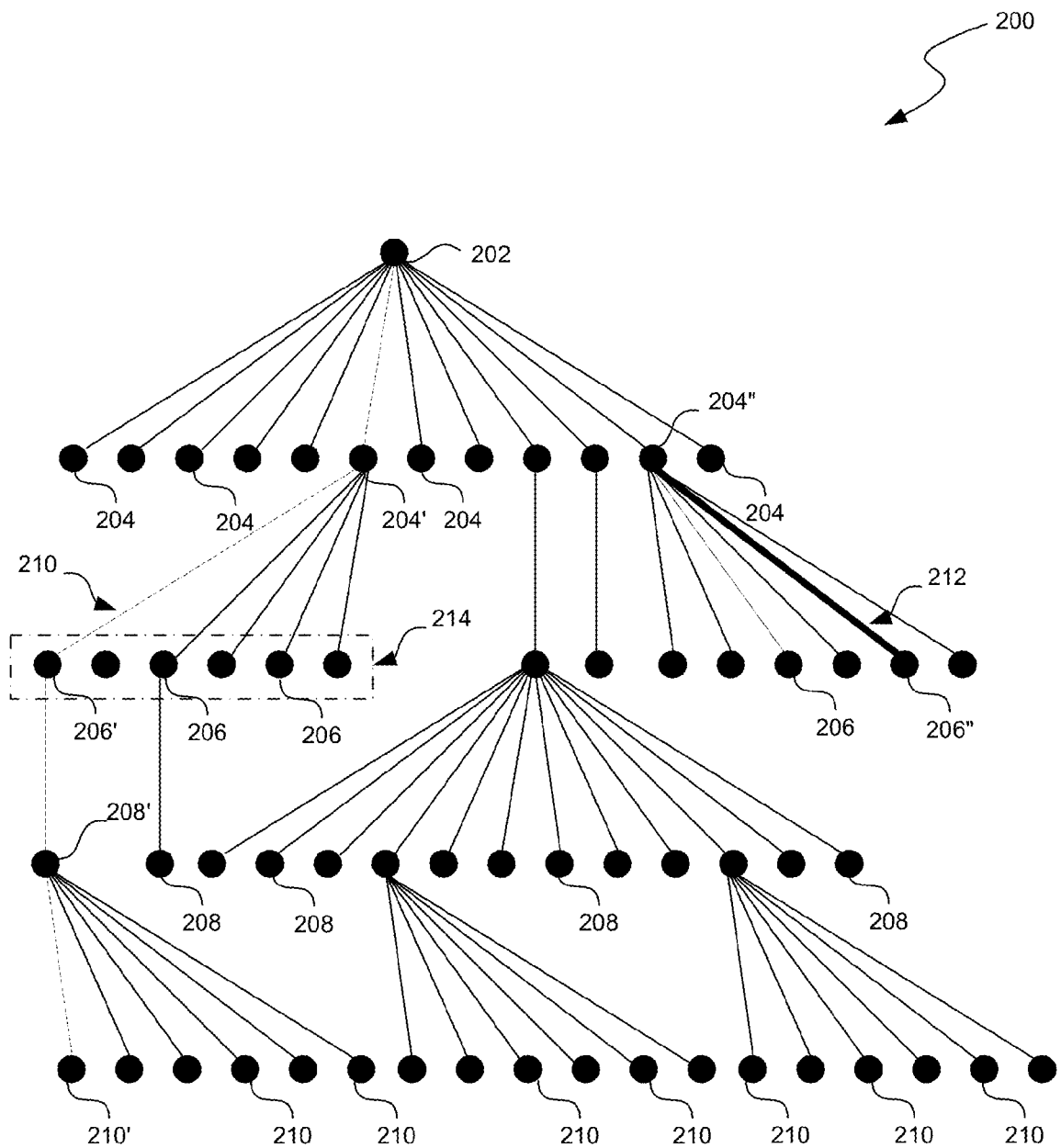

In yet another example, as shown in FIG. 5C, child nodes (e.g., nodes 210', 208', 206', 204') of a particular parent node (e.g., node 202) may be highlighted in the diffusion cascade, as illustrated with the dashed line 210. In yet another example, as shown in FIG. 5C, the diffusion cascade may be displayed with a highlighted path 212 from one of the nodes (e.g., node 206") to all other connected nodes (e.g., node 204"). In further examples, all child nodes of a particular node (e.g., 204') may be highlighted by, e.g., a rectangle 214 and/or other suitable highlighting features (not shown).

Figure 5D:
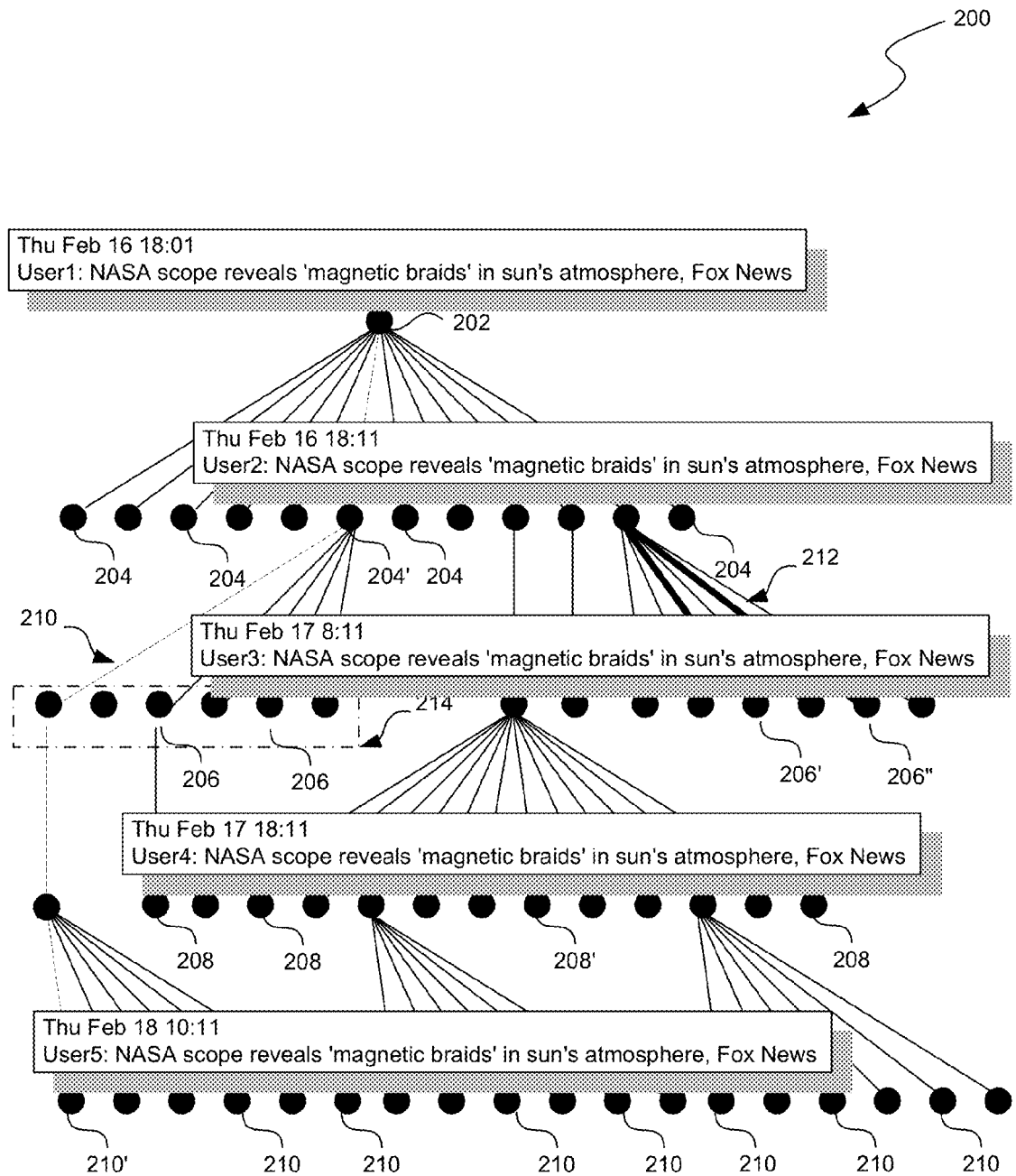

In yet further examples, the nodes 200 may be actuated to display user information, network content information, and/or other suitable information. For instance, as shown in FIG. 5D, the nodes 200 may be actuated (e.g., by a click) to display a date/time of adoption (e.g., Thu February 26 18:01), a user identification (e.g., User1), a title of the content (e.g., "NASA scope reveals 'magnetic braids' in sun's atmosphere"), and a publisher (e.g., "Fox News").

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method of determining network content virality, comprising:
   receiving, with a processor, network data having a plurality of time points at which individual users interact with a network content item and connection information of the users in the computer network, wherein the connection information indicates one or more social network relationships among the individual users over the computer network;
   determining a temporal propagation pattern of the network content item across the computer network by inferring propagation of the network content item from one user to another based on the plurality of time points and the connection information, wherein inferring propagation further comprises:
      successively designating a plurality of parent-child node relationships for each pair of individual users to derive a diffusion cascade, wherein a first user is assigned as a parent node if connected to a respective second user assigned as a child node, and wherein a first time point of the plurality of time points corresponding to the first user occurs earlier than a respective second time point corresponding to the second user;
   calculating, with the processor, a virality metric of the network content item based on a fraction of a largest number of child nodes of a single parent node over a total number of nodes in the diffusion cascade;
   determining whether the calculated virality metric is above a threshold value; and
   transmitting recommendations of the network content item to additional users via the computer network when the calculated virality metric is above that threshold value.

2. The method of claim 1 wherein determining the temporal propagation pattern includes constructing the diffusion cascade having a plurality of nodes representing the users, the nodes being arranged based on the time points at which the individual users adopt the network content item.

3. The method of claim 1 wherein determining the temporal propagation pattern includes:
   determining one of the users with an earliest time point; and
   inferring that the other users adopt the network content item from the one of the users.

4. The method of claim 1 wherein determining the temporal propagation pattern includes:
   determining one of the users with an earliest time point;
   designating the determined one of the users as a root node;
   inferring that the other users adopt the network content from the one of the users; and
   designating the other users as child nodes of the root node.

5. The method of claim 1 wherein the time points include a first time point associated with a first user and a second time point associated with a second user connected with the first user, and wherein determining the temporal propagation pattern includes:
   determining if the first time point is earlier than the second time point;
   if the first time point is earlier than the second time point, inferring that the second user adopts the network content item from the first user.

6. The method of claim 1 wherein the time points include a first time point associated with a first user and a second time point associated with a second user connected with the first user, and wherein determining the temporal propagation pattern includes:
   determining if the first time point is earlier than the second time point;
   in response to determining that the first time point is earlier than the second time point,
      designating the first user as a parent node;
      inferring that the second user adopts the network content item from the first user; and
      designating the second user as child node of the parent node.

7. The method of claim 1 wherein successively designating the plurality of parent-child node relationships includes:
   comparing one of the time points to another of the time points;
   determining if the one of the time points corresponds to one of the users connected to another one of the users corresponding to the another of the time points;
   in response to determining that one of the time points is earlier than another of the time points and the one of the users is connected to the another one of the users,
      designating the one of the users as a parent node and the another one of the users as a child node; and
      repeating the comparing, determining, and designating operations until all of the time points are processed to derive the diffusion cascade.

8. The method of claim 7 wherein calculating the virality metric of the network content includes calculating the virality metric also based on at least one of:

an average distance between all pairs of the nodes in the diffusion cascade, the distance between a pair of nodes being a distance of shortest path between the pair of nodes;
a probability that two random nodes have a distinct parent node in the diffusion cascade; or
an average depth of the nodes in the diffusion cascade.

9. The method of claim 7, further comprising displaying the derived diffusion cascade in a static or time lapsed manner.

10. The method of claim 7, further comprising:
displaying the derived diffusion cascade with child nodes of a particular parent node highlighted; or
displaying the derived diffusion cascade with a highlighted path from one of the nodes to all other connected nodes.

11. The method of claim 1, further comprising identifying trending network content items and/or corresponding users based on the calculated virality metric of the network content items.

12. A computing system, comprising:
a processor; and
a memory containing instructions executable by the processor to cause the processor to perform a process including:
receiving, with the processor, network data having a plurality of time points at which individual users interact with a network content item and connection information of the users in the computer network, wherein the connection information indicates one or more social network relationships among the individual users over the computer network;
determining a temporal propagation pattern of the network content item across the computer network by inferring propagation of the network content item from one user to another based on the plurality of time points and the connection information, wherein inferring propagation further comprises:
successively designating a plurality of parent-child node relationships for each pair of individual users to derive a diffusion cascade, wherein a first user is assigned as a parent node if connected to a respective second user assigned as a child node, and wherein a first time point of the plurality of time points corresponding to the first user occurs earlier than a respective second time point corresponding to the second user;
calculating, with the processor, a virality metric of the network content item based on a fraction of a largest number of child nodes of a single parent node over a total number of nodes in the diffusion cascade;
determining whether the calculated virality metric is above a threshold value; and
transmitting recommendations of the network content item to additional users via the computer network when the calculated virality metric is above that threshold value.

13. The computing system of claim 12 wherein the diffusion cascade include a plurality of nodes representing the users, the nodes being arranged based on the time points at which the individual users adopt the network content item.

14. The computing system of claim 12 wherein inferring propagation further comprises:
determining that one of the users has an earliest time point; and
inferring that the other users adopt the network content item from the one of the users.

15. The computing system of claim 12 wherein inferring propagation further comprises:
determining that one of the users has an earliest time point;
designating the determined one of the users as a root node;
inferring that the other users adopt the network content from the one of the users; and
designating the other users as child nodes of the root node.

16. The computing system of claim 12 wherein calculating the virality metric of the network content includes calculating the virality metric also based on at least one of:
an average distance between all pairs of the nodes in the diffusion cascade, the distance between a pair of nodes being a distance of shortest path between the pair of nodes;
a probability that two random nodes have a distinct parent node in the diffusion cascade; or
an average depth of the nodes in the diffusion cascade.

17. A computer readable storage device containing instructions executable by the processor to cause a processor to perform a process including:
receiving, with the processor, network data having a plurality of time points at which individual users interact with a network content item and connection information of the users in the computer network, wherein the connection information indicates one or more social network relationships among the individual users over the computer network;
determining a temporal propagation pattern of the network content item across the computer network by inferring propagation of the network content item from one user to another based on the plurality of time points and the connection information, wherein inferring propagation further comprises:
successively designating a plurality of parent-child node relationships for each pair of individual users to derive a diffusion cascade, wherein a first user is assigned as a parent node if connected to a respective second user assigned as a child node, and wherein a first time point of the plurality of time points corresponding to the first user occurs earlier than a respective second time point corresponding to the second user;
calculating, with the processor, a virality metric of the network content item based on a fraction of a largest number of child nodes of a single parent node over a total number of nodes in the diffusion cascade;
determining whether the calculated virality metric is above a threshold value; and
transmitting recommendations of the network content item to additional users via the computer network when the calculated virality metric is above that threshold value.

18. The computer readable storage device of claim 17 wherein inferring propagation further comprises:
determining that one of the users has an earliest time point; and
inferring that the other users adopt the network content item from the one of the users.

19. The computer readable storage device of claim 17 wherein inferring propagation further comprises:
determining that one of the users has an earliest time point;
designating the determined one of the users as a root node;
inferring that the other users adopt the network content from the one of the users; and
designating the other users as child nodes of the root node.

20. The computer readable storage device of claim 17 wherein calculating the virality metric of the network content includes calculating the virality metric also based on at least one of:

an average distance between all pairs of the nodes in the diffusion cascade, the distance between a pair of nodes being a distance of shortest path between the pair of nodes;

a probability that two random nodes have a distinct parent node in the diffusion cascade; or an average depth of the nodes in the diffusion cascade.

* * * * *